July 15, 1958

M. E. GLASSER 2,843,119

RESPIRATORS FOR ANIMALS

Filed Sept. 14, 1955

INVENTOR
Max E. Glasser

ATTORNEY

July 15, 1958 M. E. GLASSER 2,843,119
RESPIRATORS FOR ANIMALS
Filed Sept. 14, 1955 4 Sheets-Sheet 2

INVENTOR
Max E. Glasser

BY

ATTORNEYS

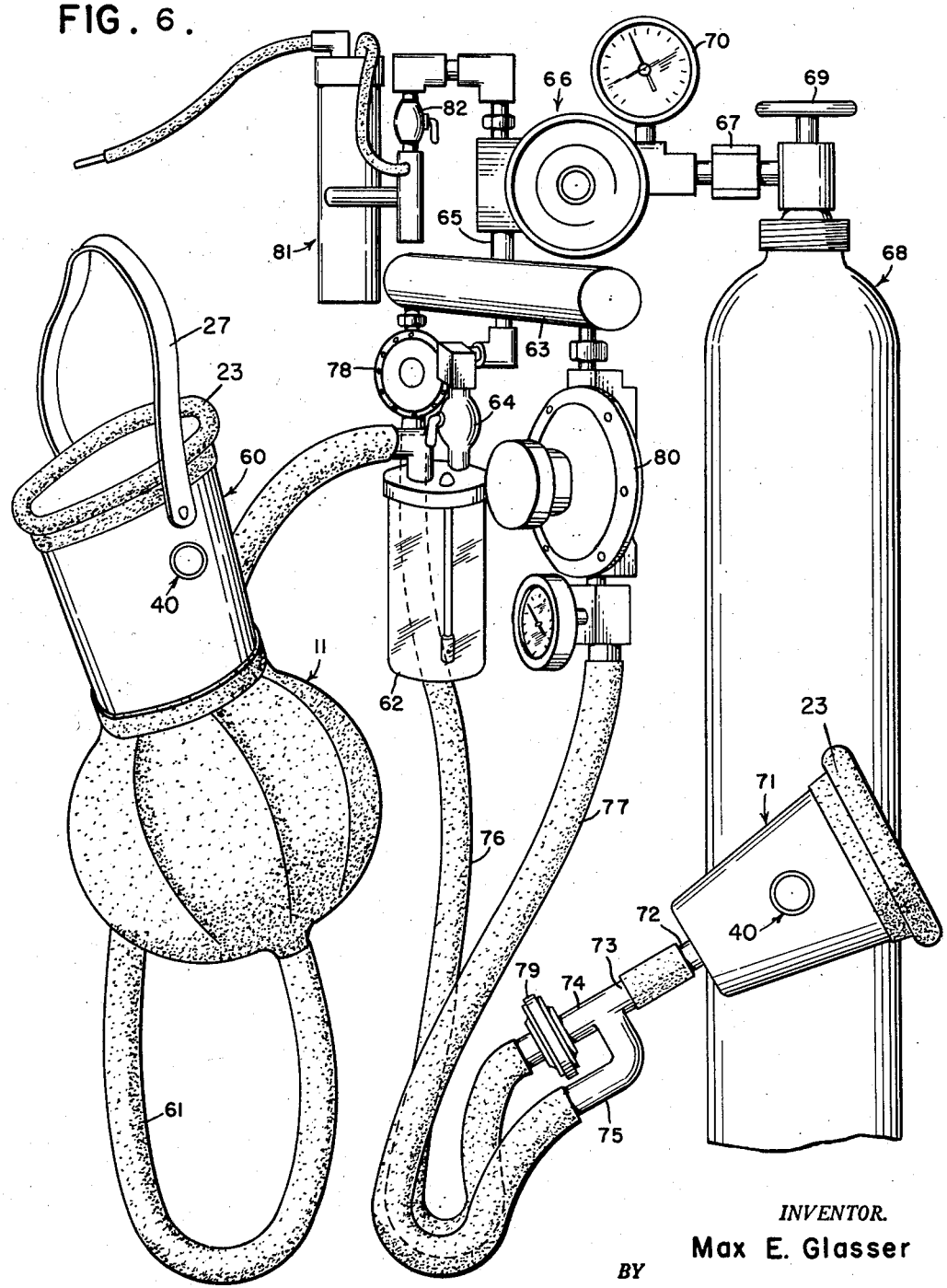

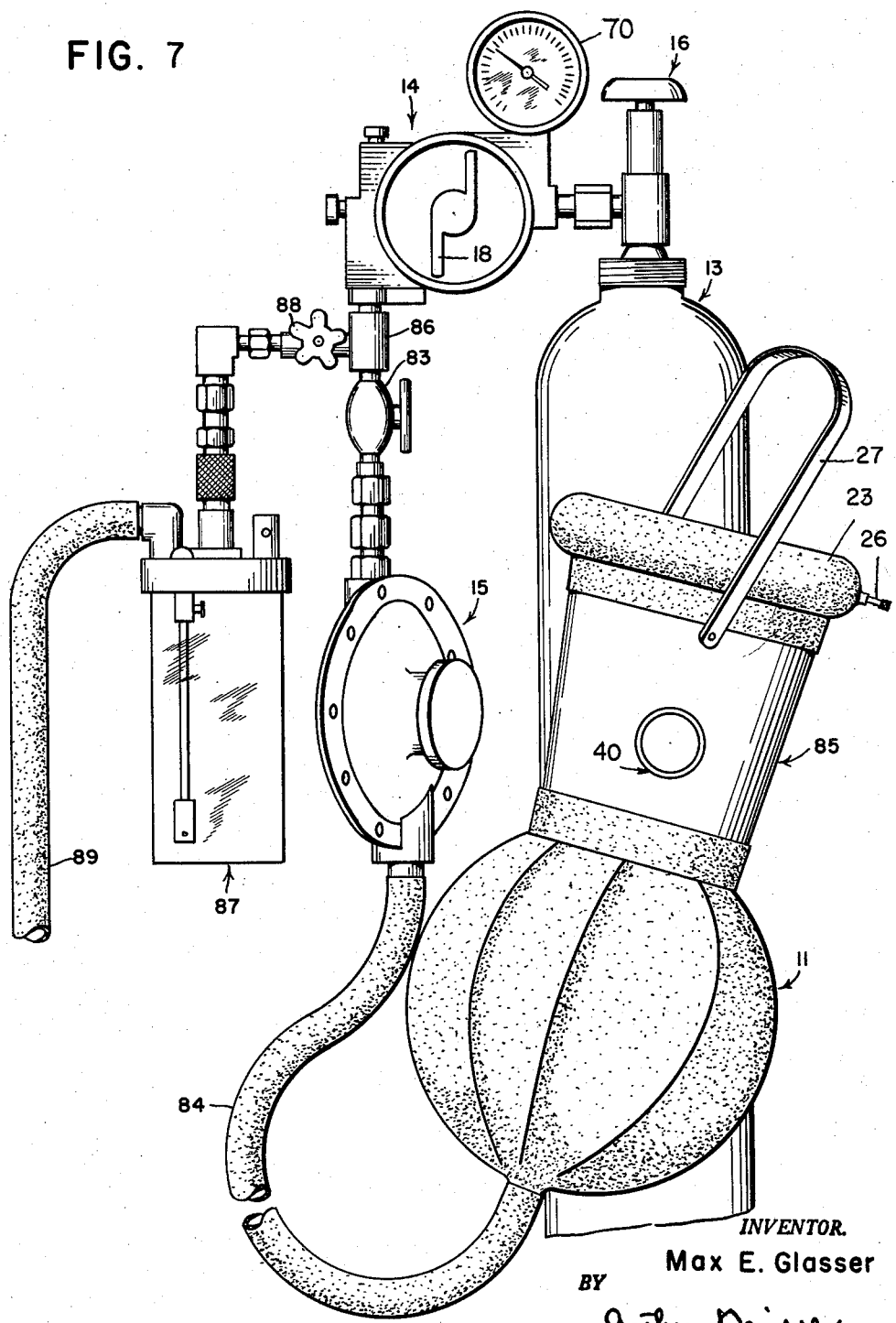

United States Patent Office 2,843,119
Patented July 15, 1958

2,843,119

RESPIRATORS FOR ANIMALS

Max E. Glasser, Coral Gables, Fla.

Application September 14, 1955, Serial No. 534,270

7 Claims. (Cl. 128—142)

This invention relates generally to respirating apparatus and with more particularity pertains to respirating apparatus adapted for use with animals, such as racing horses, greyhound dogs, and the like.

This invention embodies fundamentally a respirating mask or nosepiece to isolate and create an atmosphere of substantially pure oxygen in the region of the animal's nostrils and of mechanism and apparatus associated therewith to supply a quantity of low pressure oxygen thereto. The invention may or may not be used in conjunction with a nebulizing mechanism so that medication may be supplied and administered to the animal simultaneously with the supply of substantially pure oxygen.

The main purpose of this invention is to provide apparatus for administering high flow rates of oxygen at a minimum of pressure to animals such as racing horses, for the purpose of quickly restoring the oxygen content of the animal's blood to a normal condition after the supply of blood oxygen has been depleted, such as during a race. The apparatus will also restore to normal other conditions and will have an effect to reduce the cooling-off period of racing animals to a minimum and thus save the animal the prolonged discomfort normally encountered during such periods. The apparatus also has other uses such as to condition a racing animal for the purpose of urging it to expend the utmost physical effort during a race. The animal will quickly learn that he is spared the discomfort and exhaustion normally encountered during expended physical effort by the use of this device. As soon as the animal becomes accustomed to the use of the device he will no longer hold himself back during a race, such as he would normally do in order to minimize the exhaustion and respiratory difficulty encountered after the extended physical effort. Consequently the animal will be spurred on to greater physical achievement by the use of this device.

It is, therefore, an object of this invention to provide a respirating apparatus for animals such as horses, greyhound racing dogs and the like, which is particularly adapted to administer and supply an atmosphere of substantially pure oxygen thereto.

Another object of this invention is to provide a respirating apparatus in conformity with the preceding object, wherein the mechanism is particularly adapted through its structural characteristics for use on animals.

A further object of this invention resides in the provision of a respirator for animals which includes a body portion open at one end to receive therein an animal's nose and with pressure-operated intake and exhaust valves mounted in the body for receiving a supply of oxygen and for expelling air from the interior of the body respectively.

Another object of this invention lies in the structural characteristics of a respirating device in conformity with the preceding object and wherein an auxiliary intake valve is provided for the purpose of satisfying an overload demand for atmosphere which may be occasioned by an unusually deep gasp on the animal's part, in which case, a certain amount of outside air will be drawn into the nosepiece of the respirator along with the oxygen so that the animal may breathe the same.

Another object of the invention is to provide an apparatus for conveniently treating respiratory diseases of animals by administering thereto a supply of substantially pure oxygen having mixed therewith certain amounts of medicines beneficial to recovery from respiratory diseases, for example such medicines as penicillin, streptomycin, etc. The device when thus used is also beneficial in preventing spread of such respiratory infections within the confines of the stable and is also beneficial in treating animals for post-surgery shock and for resuscitation of new born foals.

A further object of this invention is to provide an apparatus of the character described which will be beneficial in preventing physical fatigue and mental confusion of racing animals such as would occur in high altitude flying and to aid in transportation of such animals from one track to another to reduce mental confusion due to lack of sufficient ventilation in moving vans.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

In the drawings:

Fig. 6 is a view showing a combination unit particularly adapted for use in surgery and for treatment with medicaments; and Fig. 7 is a view showing another combination unit.

Figure 1:
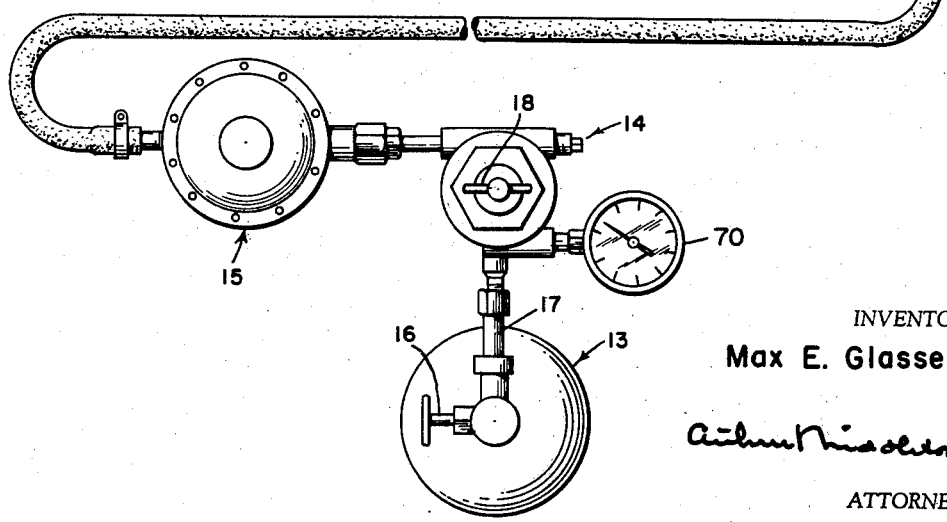
Fig. 1 is a view showing the entire respirating apparatus and system as applied to a horse.

Reference will be had at this time most particularly to Fig. 1 wherein the complete assemblage is shown. The reference numeral 10 indicates generally the nosepiece which is fitted over the nose of the animal in the manner shown and which has attached to and depending from its lower end a reservoir bag 11 which in turn is connected at its lower end to a conduit or hose 12 leading to a source of oxygen under pressure, such as the supply tank 13. The regulating valve mechanisms 14 and 15 are interposed in the connection between the supply tank and the reservoir bag. The tank 13 may be of any conventional construction and includes the shut-off valve 16 and outlet nipple 17 to which the regulating valve 14 may be directly connected. The regulating valve 14 has a manually operable control handle 18 to regulate the flow of gas therethrough whereas it is preferred that the regulating valve 15 be of the automatic type in that it is preset to deliver a predetermined flow characteristic at a predetermined outlet pressure. In any case, the two valves 14 and 15 cooperate to allow a high rate of flow to be supplied from the tank 13 to the respirating apparatus with the gas being delivered at relatively low pressure. For example, the outlet pressure from the valve 15 may be in the neighborhood of 11 inches water column.

Figure 2:
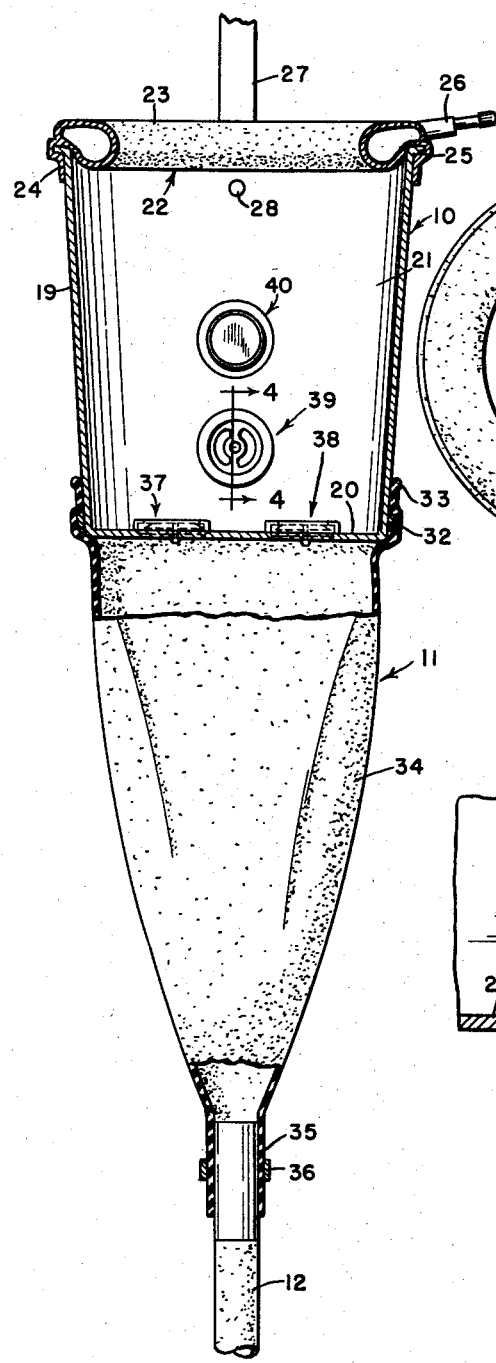
Fig. 2 is a vertical section through the nosepiece and reservoir bag showing details of internal construction and also illustrating the sealing mechanism at the top of the nosepiece.
Figure 3:
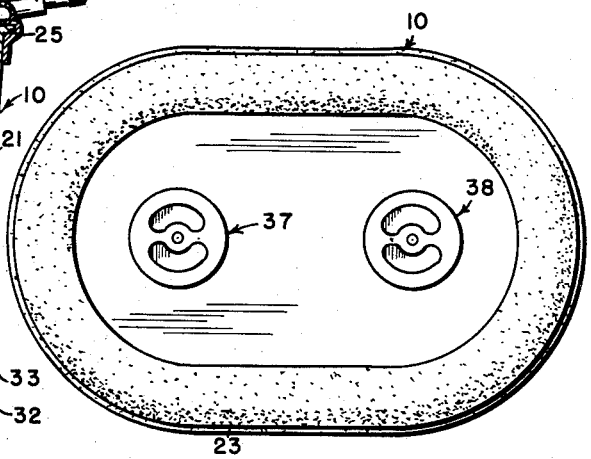
Fig. 3 is a top plan view of the nosepiece.

The nosepiece as shown most clearly in Fig. 2 consists of a rigid body preferably formed of plastic material or other suitable substance and which has a continuous side wall 19 and an integral bottom wall 20 such as to provide a chamber 21 into which the animal's nose may be projected. The specific configurations shown in the drawings of the nosepiece need not necessarily be adhered to since other shapes will suffice, it being only necessary that there be a little clearance between the top edge of the nosepiece and the animal's nose when the body is fitted into place so that the sealing means which is indicated generally by the reference character 22 may properly function.

This sealing means embodies a hollow ring 23 of resilient material such as synthetic or natural rubber or the like, which has an annular flap or flange 24 securely attached thereto and which in turn is affixed to the upper rim of the body wall portion 19. In this respect it will be noted that the upper edge of the side wall 19 is provided all around with a radially extending flange or lip 25 which is of greater outside diameter than the inside diameter of the annular flap 24 which is rigid with the sealing ring 23. Thus, when the sealing ring and its flap 24 are positioned in the manner shown in Fig. 2, with the flap engaged over the upper edge of the nosepiece, the inherent resiliency of the flap material and the ring will effect a grip upon the lip 25 with the sealing ring 23 resting upon the upper edge of the side wall 19 and projecting radially inwardly thereof into the confines of the chamber 21. The sealing ring is provided with the valve stem 26 of any suitable form such as for example the type used in automobile inner tubes and any conventional type of hand pump or other source of air under pressure may be applied thereto to inflate the hollow ring 23 after the nosepiece has been positioned over the animal's nose, thus snugly inflating the ring against the animal and effecting a seal thereat.

A strap 27 is secured at one end to the side wall 19 as by a rivet 28 and a further strap 29 is diametrically secured to the side wall by means of the rivet 30 and the two straps are passed over the top of the animal's head and secured together as by the buckle 31 so as to retain the nosepiece in place and prevent its accidental removal from the animal.

The lower end of the side wall 19 is provided with a circumscribing attaching ring 32 for the purpose of providing an anchor for the reservoir bag 11. The reservoir bag, as seen in Fig. 2, has a relatively wide mouth which preferably is provided with a rolled edge 33 and the mouth of the bag is slipped over the lower end of the nosepiece and over the attaching ring or sleeve 32 so that the same is held in place by the expansion of the bag necessitated by the attaching sleeve. The main portion 34 of the bag depends from the lower end of the nosepiece and is constricted gradually towards its lower end to terminate in the snout 35 which is slipped over one end of the conduit or flexible hose 12 to sealingly engage therewith. To assure that the conduit and the bag are not separated or the connection broken, a suitable hose clamp 36 of any conventional form may be applied in the manner shown in Fig. 2.

For the purpose of admitting air into the nosepiece from the reservoir bag 11, the bottom wall 20 of the nosepiece is provided with a pair of intake valves 37 and 38. An exhaust valve 39 is associated with the side wall 19 for expelling air from the interior of the nosepiece and in addition thereto there is provided a further intake valve 40 which will permit, under overload conditions, air to be admitted into the interior of the nosepiece or into the chamber 21.

All of the valves are of the one-way pressure-operated type so as to provide for simplicity and for dependability.

Figure 5:
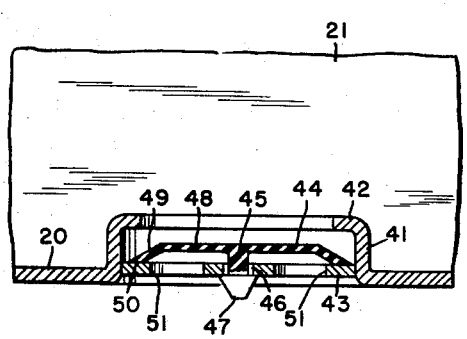
Fig. 5 is an enlarged sectional view taken through the bottom wall portion of the nosepiece and illustrating details of construction of one of the intake valves.

One of the intake valves in the bottom wall 20 is shown in detail in Fig. 5 and in this case it will be seen that the bottom wall is deformed to provide an upstanding cylindrical or annular body portion 41 which is provided at its upper extremity with an inwardly directed flange 42. A valve seat plate 43 is snugly inserted and held within the body portion 41 in spaced relation to the flange 42 and this plate forms a seat for a flexible valve head 44. The valve head has an integral stem 45 located centrally thereof and projecting laterally therefrom through a central opening 46 in the seat plate 43 and terminates in an enlarged head 47 so that the valve seat plate is sandwiched between this head and the valve head 44. The central portion 48 of the valve head is disc-like and is normally located in spaced relation to the valve seat plate 43 whereas an annular peripheral portion of the valve head is frusto-conical in shape and is rigidly integrally attached to the central portion 48 to project laterally outwardly therefrom to terminate in a sealing edge 50 which contacts throughout its length a marginal portion of the valve seat plate 43 to form a seal thereat so that no gas may be supplied through the several openings or apertures 51 in the valve seat plate, which are located inwardly from the marginal portion with which the valve head sealing edge 50 engages. Thus, communication through the valve seat plate may be had only if a pressure differential occurs between the interior of the nosepiece or the chamber 21 and the interior of the reservoir bag 11 and then the direction of flow will be only into the chamber 21.

Figure 4:
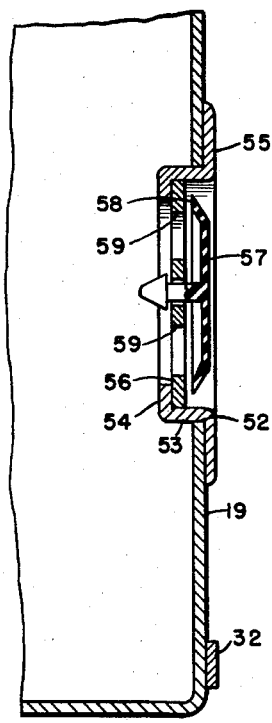
Fig. 4 is an enlarged sectional view taken substantially along the plane of line 4—4 of Fig. 2 and showing the construction of one of the pressure-operated valves.
Figure 4:
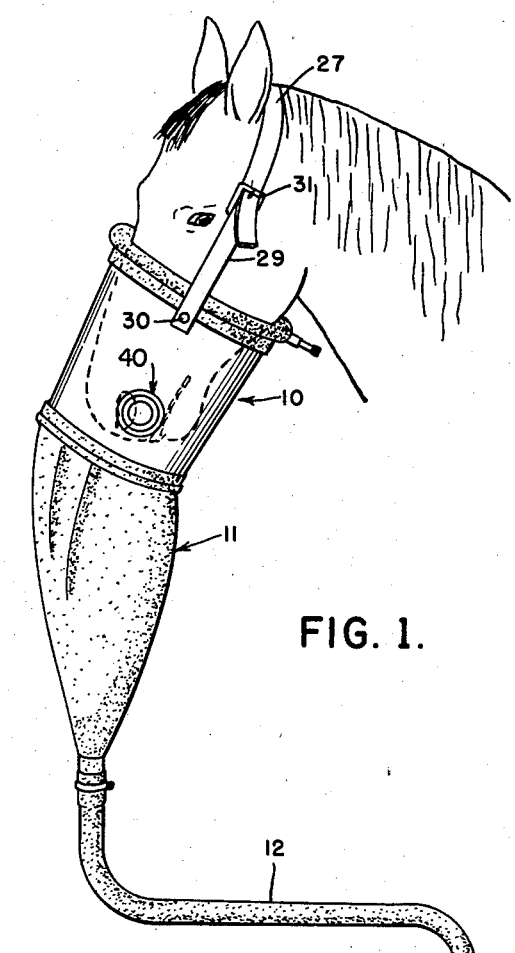

The exhaust valve 39 is shown in enlarged detail in Fig. 4. In this case, the side wall 19 has been provided with an opening 52 through which a valve body insert 53 is projected. On the inner side, the valve body 53 is provided with an inwardly directed annular flange 54 whereas on its outer side it is provided with a radially outwardly projecting flange 55. The relationship of the body side wall 52 and the outside of the body 53 may be such that a snug interengagement is had therebetween although it will be realized that the outer flange 55 may be used to advantage with suitable fastening means to rigidly affix the insert to the side wall 19. Further, the disc-like valve seat plate 56 is snugly received within the interior of the insert body 53 and is engaged or abutted against the flange 54 thereof so as to be positioned in the manner shown in Fig. 4. The resilient valve head 57 has its peripheral sealing edge 58 engaged with a marginal portion of the seat 56 so as to normally block off the openings 59 through the seat and permit expulsion of air therethrough only when the pressure within the chamber 21 exceeds that of the outside air.

In any case, the valve heads 44 and 57 are similarly formed and operate in the same manner. The relationship is such that the enlarged head 47 as shown in Fig. 5 is so positioned as to normally engage the sealing edge 50 of the valve head with the valve seat plate. When a differential of pressure is occasioned across the valve, the flexible and resilient valve head will be deformed so as to permit the sealing edge 50 to disengage from the valve seat and allow passage of gas therethrough.

The pressure of oxygen as delivered to the two regulating valves 14 and 15 is not such as to cause any substantial flow, if in fact any flow whatsoever, through the intake valves 37 and 38, but the relationship between the oxygen pressure and these valves is such as to permit their ready opening as soon as the animal begins to inhale. The bag 11 is, of course, collapsible and operates as a surge tank to assure sufficient supply of oxygen to the animal under most circumstances. However, it will be realized that under some conditions the animal may experience an unusually large gasp or gulp in which case, if the supply of air within the bag 11 and the normal flow through the valves 14 and 15 are not sufficient to supply the demand, the differential between the supply and demand will be taken up by air bled into the chamber 21 through the intake valve 40 in the side wall and will be augmented by outside air through this valve.

It is proposed that the respirating apparatus be utilized after each race or training trial run. Continued administration in such a manner will quickly teach the animal to become accustomed to the beneficial effects produced by the administration of substantially pure oxygen. The effect of the substantially pure oxygen is to help restore the animal to normal far more quickly than would be occasioned under usual conditions and the rapid restoration will enable the animal to conserve energy and race more frequently over a longer period of his life span. In the case of race horses, a normal cooling-off period after a race is one hour or more during which time the animal is walked around continually to prevent stiffness. With the administration of oxygen, as hereinbefore set forth, the cooling-off period is decreased to only 10 to 15 minutes and the substantial saturation of the blood hemoglobin with oxygen aids in removing lactic acid from the animal's system during the cooling-off period and this in turn prevents stiffness during the time the horse is standing and being administered oxygen. The cooling-off period with oxygen administration and no walking gives the animal complete relaxation and drying, with no stiffness developing.

Any suitable form of nebulizer may be inserted in the supply line from the tank 13 to the reservoir bag 11 and suitable medicine mixed with the oxygen in this manner.

With the use of this device, the animal comes to expect substantially no discomfort after enormous physical exertion and he is, therefore, more inclined to exert himself physically, both more frequently and more strenuously than he might under normal circumstances.

With reference now more particularly to Fig. 6, the modified unit shown is particularly adapted for use in connection with surgery and for the application of medicaments for inhalation by the animal. The unit consists of a mask 60 connected through the medium of a flexible tubing 61 to the jet nebulizer 62 which in turn is connected to the manifold 63, a shut-off valve 64 being interposed in such connection. The mask 60 is identical to the mask 10 of Fig. 1, previously described.

The manifold 63 has an inlet nipple 65 by means of which it is connected to the reducing valve mechanism 66, the reducing valve being connected through the coupling element 67 to the oxygen supply tank 68, the supply tank being of conventional form and having a hand valve control 69 associated therewith.

As in the case of the system shown in Fig. 1, a pressure gauge 70 is utilized to determine the pressure content of the tank 68.

The unit also employs a second mask 71 which is of such dimension as to be readily applied to a new-born foal, for example.

This mask 71 is of similar construction to the previously described mask 61 but does not employ the inflatable reservoir 11. It is connected at its inlet 72 to one branch 73 of a three branch connector, the other two branches 74 and 75 of which are connected to the flexible conduits 76 and 77 respectively. One of the conduits 76 is connected with a reducing valve member 78 which in turn is connected to the previously described manifold 63. The branch 74 has employed therein a Burns valve 79 for intermittently supplying positive pressure to the mask 71, whereas the other conduit 77 is connected to the reducing valve 80 and hence to the manifold 63.

The mechanism indicated generally by the reference character 81 is any standard type of aspirator, the particular unit shown being a Stanton aspirator and its connection to the system is controlled by means of a shut-off valve 82 for use as desired.

The valve 66 is of the type known as a demand pneophore and will begin an automatic rhythmic cycling so that the animal's lungs will be ventilated and kept under positive pressure inflation should the animal develop respiratory difficulty or arrest.

The complete unit is compact and light weight and it may be readily attached to any standard size oxygen cylinder and when used with the 60 cubic foot cylinder (approximately 40 lbs.) the unit becomes highly portable.

The unit serves to administer 100% oxygen upon the animal's demand while breathing voluntarily and at such time the animal will control both the rate and depth of respiration. Should the animal develop respiratory difficulty or arrest, the unit will automatically begin and as soon as the animal once again assumes voluntary breathing, the conversion from rhythmic automatic cycling to demand inhalation is accomplishd with no manipulation necessary by the operator. For use in surgery as a surgical aid, in all involved procedures, as an aid in post-operative recovery and for the easier and earlier relief from anesthesia, the unit may be used with the modified mask 71 attached to the Burns valve 79. The use of the jet nebulizer acts as a further aid in post-operative recovery and for the reduction of incidence of the respiratory involvement. Thus, the mask 71 can be either of a size to be used with a full grown horse or with a foal.

The units above described permit administration of 100% oxygen to large animals and special regulation has been devised to reduce incidence of excessive pressures and noises. To this end, it is preferred that at least two pressure reduction steps be utilized such that neither is of such magnitude as to cause excessive noise which may frighten the animal. Further, the various flexible conduits above described are preferably formed from corrugated flexible tubing which aids in muffling any noise. A jet nebulizer may be utilized easily with the assembly shown in Fig. 1 by merely introducing the nebulizer in such system.

Further advantages of the units described are (A) control of the oxygen percentage of the inspired air, (B) reduction of inspiratory pressure to very near atmospheric pressure, (C) exhalation at ambient pressure, (D) reduction of noise to the point where it will not disturb excited animals, (E) prevention of excessive accumulation of carbon dioxide and (F) adaptability of the use with minor modifications for the administration of aerosols, resuscitation and inhalation anesthesia.

With the use of the unit shown in Fig. 1, for example, in treating respiratory embarrassment, the large volume of low pressure oxygen is passed through the flexible tube 12 which is preferably corrugated and which is preferably of a length in the order of 18 feet to baffle any noise. Upon inhalation, the valves 37 and 38 at the base of the mask, see Fig. 2, open readily to admit oxygen, whereas upon exhalation, the valves 39 which are directed opposite the animal's nares open to allow exhale air to pass out of the mask. As an added safeguard, an additional respiratory valve 40 is provided to open easily should the animal at any time require a greater volume of air than that being delivered and in this manner the percentage of oxygen can, of course, be controlled. The flow of oxygen can, of course, be controlled simply by manipulation of the control valves and the device is of such foolproof nature that it does not require a trained technician to operate the unit. Because of the semi-demand feature of the mask it is merely necessary to turn the oxygen up sufficiently to keep the breathing bag partially inflated. Should the bag collapse upon inhalation, insufficient oxygen is being admitted whereas on the other hand, should the bag remain constantly inflated, an excess of oxygen is being used, either condition being readily rectified by manipulation of the control valve. On the other hand, excess oxygen cannot harm the animal since it cannot produce an unwanted pressure due to the presence of the exhalation valves of the mask.

The valve 14 specifically shown is a two stage reduction valve of the type made by The Bastian-Blessing Company, 4201 W. Peterson Avenue, Chicago 30, Illinois, the 2060 series model. The valve 15 is of the type manufactured by the same company specified above and is the 2503 series model, a single stage reduction valve.

The second stage diaphragm of the valve 14 is of 3⅛" diameter whereas the diaphragm of the valve 15 is 6½" in diameter. These large diameter diaphragms permit substantially more or less pressure reduction within the ranges required for proper operation of the units.

It will be appreciated, of course, that any suitable valve 14 or 15 may be used and the above specific examples need not be used, it being important only that the two valves combined supply a large volume of low pressure oxygen to the animal with some means for regulating the flow volume as may be required by the particular animal and particular condition.

It will be noted that with the nosepiece 71 of Fig. 6 one conduit 77 thereof is connected directly to the manifold 63 through the medium of the Burns valve 79 and the reduction valve 80, whereas the other conduit 76 is connected to such manifold through the reduction valve 78. The reduction valves 78 and 80 are so set or adjusted such that a greater positive pressure is maintained in the conduit 77 than at the conduit 76. The conduit 76 is always in direct communication with the nosepiece 71 and hence establishes a constant positive pressure therein. Upon respiratory embarrassment of the animal the Burns valve 79 will automatically operate to cyclically and rhythmically open and close to admit the material impulses of greater positive pressure than is established by the conduit 76 and the reduction valve 78 so that the animal will be automatically resuscitated and whereby the animal's lungs will always be kept under positive ventilation.

The assembly shown in Fig. 17 embodies the construction shown in Fig. 1 and in addition thereto a jet nebulizer assemblage. In Fig. 7, the reference numeral 13 indicates the source of oxygen, numeral 16 indicates the control valve, numeral 14 indicates a first pressure reduction valve and the numeral 15 indicates a second pressure reduction valve. The reduction valve 14 is connected directly to the source and the second pressure reduction valve is connected to the first reduction valve as will be clearly evident in Fig. 7, it being preferable that a control valve 83 be disposed within the connection between the two valves 14 and 15. The valve 15 is connected through the medium of a flexible conduit or hose 84 to the nosepiece assembly indicated generally by the reference character 85 which is similar to the previously described nosepiece 10, although in Fig. 7 the reservoir portion 11 is shown in inflated condition to illustrate the position assumed by this member during use.

With the assembly or unit of Fig. 7, the nosepiece 85 can be utilized to supply an atmosphere of substantially pure oxygen to the animal by manipulating the control valves 16 and 83.

Connected to the first reduction valve 14 at the T-fitting 86 is the nebulizer assembly indicated generally by the reference character 87, there being a control valve 88 associated in the connection between the nebulizer and the valve 14 to control the flow of oxygen to the jet nebulizer. The nebulizer is in turn connected by means of a suitable flexible conduit or tube 89 to another nosepiece, not shown, which may alternatively be used for the purpose of supplying an atmosphere of oxygen mixed with a medicament for the purpose previously set forth.

I claim:

1. A respirator for animals such as horses, comprising a mask having a body providing a side wall having rigid top edge portion, a bottom wall and an open top so that the body is placeable over an animal's nose, a pressure-operated exhaust valve on the mask through which air is expellable from the interior thereof, and a pressure-operated intake valve on the mask through which oxygen may be introduced into the interior of the body for inhalation by the animal, said mask having a connection surrounding said intake valve to a source of oxygen, with the addition of annular inflatable sealing means detachably engaged over the top edge portion of said body and comprising an inflatable annular member provided integrally with a downward skirt portion resiliently stretchable to engage snugly over and retain itself upon said rigid top edge portion.

2. A respirator for supplying substantially pure oxygen or the like to animals such as horses, comprising a mask having a body providing a continuous side wall, a bottom, and having a rigid open top formed with an outward peripheral lip so as to receive an animal's nose therein, deformable annular inflatable sealing means secured to said open top and adapted to engage around the animal's nose including an inflatable annular member provided integrally with a downward skirt portion resiliently stretchable to snugly yet detachably engage over and retain itself upon said peripheral lip, a pressure-operated exhaust valve provided upon the mask through which passes exhausting air dispelled from the animal's lungs, a pressure-operated intake valve also provided upon the mask for introducing oxygen into the interior of the body, and a connection surrounding said intake valve leading to a source of oxygen.

3. A respirator for animals such as horses, comprising a mask having a body providing a continuous side wall, a rigid bottom wall, an open top so that the body may be placed over an animal's nose, a pressure-operated exhaust valve mounted on the body through which air is expellable from the interior thereof, and a pressure-operated intake valve mounted in the bottom wall through which oxygen may be introduced into the body for inhalation by the animal, a collapsible reservoir bag having a resiliently stretchable top edge portion engaged peripherally over the bottom wall to maintain itself snugly thereon and communicating with the interior of said body through said inlet valve, and a connection between said bag and a source of oxygen.

4. A respirator for supplying substantially pure oxygen or the like to animals such as horses, comprising a mask having a body including a continuous side wall, a rigid bottom having a peripheral outward lip, said body having an open top so as to receive an animal's nose therein, a pressure-operated exhaust valve provided on said body for exhausting air dispelled from the animal's lungs, a pressure-operated intake valve provided on said bottom for introducing oxygen into the interior of said body, a collapsible reservoir bag having inlet end and a resiliently stretchable top edge portion engaging peripherally over the lip of said rigid bottom to maintain itself snugly thereon and communicating with the interior of said body through said inlet valve, and a connection between the inlet end of the bag and a source of oxygen.

5. A respirator for animals such as horses, comprising a body having a tubular side wall and a bottom wall with the top of the body being open to receive an animal's nose therein, a resilient annular sealing ring secured to the open top of said body and projecting radially inwardly thereof around the top to sealingly engage with an animal's nose, a collapsible reservoir bag engaged over the closed end of the body and including means for connecting the bag with a source of oxygen under pressure, a pressure-operated intake valve in said bottom wall providing communication between the interior of the body and the bag, a pressure-operated exhaust valve in said side wall through which is expellable air dispelled from an animal's lungs, and an auxiliary air-intake valve in said side wall for supplying auxiliary air into the body upon excessive demand therefor by the animal's lungs, each of the two last-mentioned valves including an annular body portion projecting through the wall of the body, a valve seat plate secured within the valve body portion and provided in its central portion with a plurality of openings, and a valve head secured to said seat normally engaging the same to close the seat openings and being bodily liftable to be pressure-operated to open position in one direction of flow.

6. A respirator for animals such as horses, comprising a body having a tubular side wall and a bottom wall with the top of the body being open to receive an animal's nose therein, a resilient, annular sealing ring secured to the open top of said body and projecting radially inwardly thereof around the top to sealingly engage with an animal's nose, a collapsible reservoir bag engaged over the closed end of the body and including means for connecting the bag with a source of oxygen under pressure, a pressure-operated intake valve in said bottom wall communicating the interior of the body with the bag, a pressure-operated exhaust valve in said side wall for expelling air dispelled from an animal's lungs from the body, and an auxiliary air-intake valve in said side wall for supplying auxiliary air into the body upon excessive demand by the animal's lungs, said intake valve including an annular body portion projecting through the bottom, a valve seat plate secured within the valve body portion and provided in its central portion with a plurality of openings, and a valve head secured to said seat normally engaging the same to close the seat openings, said valve head being flexible to be pressure-operated to open position in one direction of flow.

7. A respirating system for animals, which comprises a source of oxygen under pressure, a manifold, pressure reducing means connecting said source with said manifold, a nosepiece adapted to fit over an animal's nose to create an isolated atmosphere for breathing, a pair of conduits connected to said nosepiece, one of said conduits including an automatic demand valve and being connected through a pressure reduction valve to said manifold, the other conduit being connected to said manifold through another reduction valve, said reduction valves being set so as to supply a greater pressure through said one conduit than through the other conduit whereby upon respiratory embarrassment of an animal, the automatic demand valve will rhythmically open to cyclically supply greater pressure impulses of oxygen to the nosepiece than is ordinarily supplied thereto through said other conduit.

References Cited in the file of this patent

UNITED STATES PATENTS

| | | |
|---|---|---|
| 2,312,714 | Herbin | Mar. 2, 1943 |
| 2,552,595 | Seeler | May 15, 1951 |

FOREIGN PATENTS

| | | |
|---|---|---|
| 111,746 | Great Britain | Dec. 13, 1917 |
| 512,710 | Germany | Apr. 24, 1929 |
| 139,956 | Switzerland | Aug. 16, 1930 |
| 253,658 | Switzerland | Dec. 1, 1948 |